United States Patent Office 3,140,150
Patented July 7, 1964

3,140,150
PROCESS FOR THE PRODUCTION OF BORANATES
Dieter Goerrig, Lohmar, Werner Schabacher, Cologne-Mulheim, and Friedrich Schubert, Leverkusen, Germany, assignors to Farbenfabriken Bayer Aktiengesellschaft, Leverkusen, Germany, a corporation of Germany
No Drawing. Filed Dec. 23, 1957, Ser. No. 704,362
Claims priority, application Germany Dec. 24, 1956
14 Claims. (Cl. 23—14)

It is known that alkali metal and alkaline earth metal boranates can be produced from certain born compounds and metal hydrides. This can be effected in a single stage, for example according to the equation:

$$4NaH + BCl_3 = 3NaCl + NaBH_4$$

or in two or even more stages. For example, it has been proposed to react 3 mols of $NaBH_4$ with 1 mol of $BCl_3$ with formation of 2 mols of $B_2H_6$, and to produce 4 mols of $NaBH_4$ from the $B_2H_6$ thus obtained and 4 mols of $NaH$. It is also known to obtain $B_2H_6$ in a single stage from certain boron compounds and metal hydrides, for example:

$$6NaH + 2BF_3 = 6NaF + B_2H_6$$

The metal hydrides used in the known single-stage processes for the production of boranates are alkali metal hydrides such as LiH, NaH, KH, or alkaline earth metal hydrides such as $CaH_2$ or aluminum hydride $AlH_3$.

The boron compounds from which boranates are obtained with the aid of known single-stage processes are: the halides of boron from $BF_3$ to $BI_3$, the fluoroborates such as $KBF_4$ and $NaBF_4$, boron oxide $B_2O_3$, some boric acid esters such as $B(OCH_3)_3$ and some boron alkyl compounds, such as $B(C_2H_5)_3$.

Even if all previously proposed processes are unsatisfactory as regards simplicity and yield, the reaction of metal hydrides with $B_2O_3$ according to the existing state of the art gives even smaller yields.

Even under particularly favourable circumstances, yields of only 19% of the theoretical (without simultaneous grinding), and of 64% of the theoretical (with simultaneous grinding for 46 hours) are obtained by the reaction:

$$4NaH + 2B_2O_3 = NaBH_4 + 3NaBO_2$$

(Journ. Am. Chem. Soc. 75 (1953), page 205)

and of only 5.5% of the theoretical without catalysts and 17.8% of the theoretical with catalysts by the reaction:

$$4CaH_2 + 4.4B_2O_3 = Ca(BH_4)_2 + 3Ca(BO_2)_2 \cdot 0.13B_2O_3$$

(U.S.A. Patent No. 2,715,057)

Since boron oxide, even with catalysts, reacts substantially less satisfactorily than boron halides, it would be expected that the final products of this reaction, the metaborates such as $NaBO_2$ or $Ca(BO_2)_2$, would prove even less suitable initial materials for the production of boranates. This idea is for example expressed in an investigation which shows why the reaction between for example sodium hydride and boron oxide does not take place according to the equation:

$$8NaH + B_2O_3 = 2NaBH_4 + 3Na_2O$$

(Journ. Am. Chem. Soc. 75 (1953), page 205)

The present invention is concerned with a process for the production of boranates, which process consists in that a hydride of one of the metals Al, Mg, Ca, Sr, Ba, Li, Na, K, Rb, Cs is reacted with a metaborate or a metal oxide-boron oxide mixture of comparable composition of a metal of the above series which is not further to the left than the hydride metal in the said series, the reaction taking place at temperatures above 100° C. and below the melting point of the mixture, the oxide of the hydride metal and the boranate of the metal in the metaborate being formed. The idea underlying the invention will first of all be explained by reference to the use of $CaH_2$ as the metal hydride.

The new process produces results which are quite surprising. In the first place, the yields are no worse than with boron oxide, as was to be expected, but under favourable conditions are practically quantitative, even without the use of catalysts and without simultaneous grinding. It has been found that the precautionary measures which are necessary with other processes for avoiding too high a reaction temperature in the interest of obtaining a high yield are unnecessary with the process of the invention. It has been found that a batch which reacts at 350° C. at a satisfactory velocity also withstands a reaction temperature of 600° C. without any deleterious effect on the yield. The economic significance of the high yield with regard to the economical use of the valuable metal hydride is obvious. Another fact which is also of great significance is of course that, in contrast to the processes operating with boron halides or boric acid esters or even with boron alkyls, the process of the invention uses starting compounds which can be obtained in a far simpler manner from the normal commercial oxidic boron compounds, and that these compounds are converted with a substantially quantitative yield into the required product, this in particular being in contrast to the process in which boron oxide is used and with which the yields obtained are only up to a maximum of 17% of the theoretical as compared with the 25% which is theoretically possible.

The good yields obtained with the new process and the relative independence thereof to changes in temperature can in theory be explained as follows:

(a) With the processes formerly used, very large quantities of heat are liberated, both during the progress of the required reaction and during the decomposition reaction which leads to the formation of elementary boron and hydrogen. These quantities of heat lead to a rise in temperature with a simultaneous increase in the reaction velocity. The known phenomenon of a "thermal explosion" thereby results. At high temperatures, the hydrogen boride compounds which are formed are irreversibly decomposed to form the elements boron and hydrogen. This is for example clearly shown by the heat effects of the decomposition reactions:

$CaH_2 + \frac{2}{3}BF_3 \rightarrow CaF_2 + \frac{2}{3}B + H_2$   +67,800 calories
$CaH_2 + \frac{2}{3}BCl_3 \rightarrow CaCl_2 + \frac{2}{3}B + H_2$   +81,000 calories
$2NaH + \frac{1}{2}NaBF_4 \rightarrow 2NaF$
  $+ \frac{1}{2}NaH + \frac{1}{2}B + \frac{3}{4}H_2$   +42,700 calories
$CaH_2 + \frac{1}{3}B_2O_3 \rightarrow Ca(BO_2)_2 + \frac{2}{3}B + H_2 + 34,600$ calories The process of the invention differs very considerably from the above. The decomposition reaction is endothermic:

$$CaH_2 + \frac{1}{2}NaBO_2 \rightarrow CaO + \frac{1}{2}NaO + \frac{1}{2}B + \frac{3}{4}H_2 - 13{,}500 \text{ calories}$$

Furthermore, the same difference between the known processes and the present process is shown in the heat effect of the required reaction:

$2NaH + \frac{1}{2}BCl \rightarrow \frac{3}{2}NaCl \frac{1}{2}NaBH_4$ + 1,400 calories
$CaH_2 + \frac{1}{2}NaBO_2 \rightarrow CaO + \frac{1}{2}NaBH_4 + 95{,}000$ calories Now since the "thermal explosion" is avoided with the process of the invention, not only can the reaction be better controlled, but the main reason for a poor yield at relatively high temperature, namely the irreversible decomposition of the hydrogen boride compound, can easily be avoided with the process of the invention.

(b) Another fact which is in theory a fundamental advantage is that the metal ion necessary for stabilizing the $BH_4$ anion is present right from the beginning directly adjacent to the boron, whereas in the known processes the hydrogen boride which is formed must in some way come into contact with the excess metal hydride. This can of course be facilitated by thorough mixing, but this obviously cannot be extended to the atomic range. On the other hand, with the known processes, thorough mixing leads to a particularly pronounced thermal explosion.

Another fundamental advantage of the process of the invention is the fact, which has already been mentioned, that theh very different types or metal boranates, such as $LiBH_4$, $NaBH_4$, $Ca(BH_4)_2$, $Sr(BH)_2$ and $Ba(BH_4)_2$, for the production of which previously the corresponding metal hydride has always been required, can all be produced from calcium hydride. For example, the following equations form the basis of the present process:

$$LiBO_2 + 2CaH_2 \rightarrow LiBH_4 + 2CaO$$
$$Ba(BO_2)_2 + 4CaH_2 \rightarrow Ba(BH_4)_2 + CaO$$

This procedure has two essential advantages:

(1) Only one metal hydride, namely $CaH_2$, is used, and this hydride can be produced in a particularly economical manner for example according to copending application Ser. No. 521,361 filed by Dieter Goerrig, on July 11, 1955. Furthermore, it has also been found that even very impure products, for example products containing considerable proportions of $CaC_2$, $CaCO$, Al, Fe, Si and $V_2$, can be used without imparing the yield or the purity of the final product.

(2) A reaction mixture is obtained in which only the final product has good solubility in water and other solvents. Consequently, even by simple extraction of the mixture, for example by means of water, a practically pure solution of the required boranate is obtained, from which the compounds can easily be recovered in crystalized form by concentration by evaporation. This also applies when highly contaminated calcium hydrides, such as those which are formed for example by carbide hydrogenation, are used.

The basic method used for carrying out the process of the invention is that the dried metaborate of the metal the boranate of which is desired, is mixed with the required quantity of calcium hydride (deficiency or excess) and the mixture is heated below the melting point to a temperature higher than 100° C., oxidizing gases such as air and moisture being substantially excluded. After cooling, the boranate produced can be separated by extraction and isolated from the CaO which is formed and any impurities which may be present; the product can however alternatively be used without separation for purposes in which the CaO which is also formed has no distributing effect (for example for the production of $B_2H_6$).

In practice, a number of measures are employed which positively influence the yield or other essential points; examples of these are the fineness of grinding of the components, efficiency of the mixing, briquetting of the mixture, the maintenance of a predetermined time and temperature program, and the nature and pressure of the atmosphere.

These measures can be used separately or in any desired combination.

The conditions expressly set out in the examples can consequently be varied within wide limits.

The underlying idea of the process of the invention, which is the reaction of metaborates with $CaH_2$, can be extended in two directions:

(1) The rato between metal oxide and boron oxide in the starting compound does not necessarily have to be that of the metaborates, for example $$Na_2O:B_2O_3 = 1:1 \text{ or } CaO:B_2O_2 = 1:1$$

Small deviations from this ratio will in any case always occur in practice in the production of the "metaborates."

Greater deviations can be harmful, since they give a smaller yield, for example a ratio $$Na_2O:B_2O_3 \ll 1:1$$

In other cases they are harmless, except that (more material is used without increasing the yield) for example $$CaO:B_2O_3 \gg 1:1$$

In summary, it can be stated that relatively large deviations from the stoichiometric conditions of the metaborate should be avoided.

(2) (a) If $CaH_2$ in the process of the invention is replaced by $SrH_2$, it is found that it is still possible to obtain all boranates except $Ca(BH_4)_2$. On changing over to $BaH_2$, the process can however only be used on barium metaborates and the alkali metal metaborates, and in this case it is possible to obtain neither the $Ca(BH_4)_2$ nor the $Sr(BH_4)_2$. In this way, it is possible to list a series of metals Ca, Sr, Ba, Li, Na, K, Cs, in which always it is possible from the hydride of one of these metals and the metaborate of the same metal or of a metal disposed further to the right thereof to produce the boranate of the metaborate metal and the oxide of the hydride metal.

As compared with the other hydrides, the calcium hydride is consequently so outstanding (because of the three points: (1) universal utility to the end position in the derived series; (2) ready availability, for example from $CaC_2$; and (3) sparing solubility of the oxide or hydroxide as compared with the other hydrides) that the process is preferably carried out with calcium hydride.

(b) If the derived series is extended further towards the left, it is found that then the metals Al and Mg take position Al, Mg. Ca, Sr.

The practical value of this discovery is of course reduced by the fact that $MgH_2$ and $(AlH_3)$ are less readily available than $CaH_2$. The alanates, which are somewhat more readily available, can however be used instead of $(AlH_3)$.

(c) A further amplification of the basic concept of the invention is to combine the production of the hydride with the reaction in accordance with the invention; examples of this are:

$$2Mg + 2H_2 + NaBO_2 \rightarrow 2MgO + NaBH_4$$
$$2CaC_2 + 10H_2 + NaBO_2 \rightarrow 2CaO + 4CH_4 + NaBH_4$$

in which the reactions $$2CaC_2 + 10H_2 \rightarrow 2CaH_2 + 4CH_2$$

and $$2Mg + 2H_2 \rightarrow 2MgH_2$$

precede the reaction in accordance with the invention. Therefore, this procedure involves the combination of processes which are already known with the new process.

(d) A further amplification or improvement in the basic concept of the invention relies on the fact that the metal oxide which is formed in the reaction is taken up by means of an acid anhydride, such as for example $SiO_2(MgO + SiO_2 \rightarrow MgSiO_3)$. In this way, for example, it is possible to produce a more favourable equilibrium position or a more sparing solubility of the secondary product of the reaction.

*Example 1*

10 kg. of a sodium metaborate in lump form, the $Na_2O:B_2O_3$ ratio of which as determined by analysis differs by less than 0.5% from the theoretical of the composition $NaBO_2$ and which has a water content of 0.7% by weight, are mixed with 20 kg. of a technical calcium hydride in lump form in a mill and ground. The calcium hydride introduced is prepared as described in copending application Ser. No. 521,361, filed by Dieter Goerrig on July 11, 1955, by hydrogenation of commercially available calcium carbide and contains 66.5% by weight of $CaH_2$ 11.5% by weight of $CaC_2$
About 19% by weight of CaO and
About 2% by weight of other constituents.

The mill used is a wet vibrating ball mill. (Grinding liquid: benzine, grinding period: 3 hours.) The dried powder mixture is briquetted and analyzed. It contains 32.9% by weight of $NaBO_2$
44.1% by weight of $CaH_2$
7.4% by weight of $CaC_2$
13.0% by weight of CaO and
2.6% by weight of other constituents These briquettes are placed in an autoclave which, by means of an internal electrical heating system, permits the reaction material to be heated at a hydrogen pressure of 30 atm. At 350° C., a reaction was detected in which the temperature rose spontaneously to 480° C. The reaction mass was then kept at 450° C. by electrical heating. After 5 hours, calculated from the beginning of the reaction at 350° C., the autoclave was cooled to room temperature. The hydrogen, the pressure of which had been 30 atm. throughout the reaction, was vented and the material removed from the autoclave. It was resistant to dry air and had the following composition:

17.8% by weight of $NaBH_4$
1.3% by weight of $NaBO_2$
1.2% by weight of $CaH_2$
6.8% by weight of $CaC_2$
69.7% by weight of CaO and
3.2% by weight of other constituents Based on the $NaBO_2$ introduced, the yield was substantially 94.5% of the theoretical; it was 89.2% based on the $CaH_2$ introduced in excess.

A. A part of the product was submitted to extraction with water. On treatment of 2 kg. of the reaction product with 4 litres of water without external cooling, the temperature rose to about 80° C. The CaO, $CaH_2$ and $CaC_2$ present was converted by $Ca(OH)_2$ and a sludge was obtained which yields about 900 cc. of filtrate on being filtered with suction. The sludge was submitted to extraction on the suction filter with a total of 4 litres of water. The combined filtrates (about 5 litres) contained 352 g. of $NaBH_4$ and 30 g. of other constituents (mainly $NaBO_2$). The $NaBH_4$ which was formed was therefore converted with substantially a 98.9% yield into aqueous solution.

When the solution was completely concentrated by evaporation under reduced pressure at 30–80° C., 392 g. of solid substance were obtained with a $NaBH_4$ content of 347 g., which corresponds to 88.5% by weight of $NaBH_4$.

B. By an extraction treatment of another part of the reaction product with methanol, or by recrystallizing the solid substance obtained according to A from methanol, a 99.3% $NaBH_4$ was obtained in a 94% yield, based on the $NaBH_4$ content of the reaction mass. A solution which contained about 11% by weight of $NaBH_4$ was thereby cooled from room temperature to −50° C.

*Example 2*

In a manner completely analogous to Example 1, a mixture was prepared from potassium metaborate and technical calcium hydride, grounds and briquetted, this mixture having the composition:

36.9% $KBO_2$
38.1% $CaH_2$
4.5% $CaC_2$
18.0% CaO and
2.5% other compounds

The reaction was carried out under the conditions indicated in Example 1 and in the same apparatus and yielded a product having the composition:

23.7% by weight of $KBH_4$
0.3% by weight of $KBO_2$
0.4% by weight of $CaH_2$
4.3% by weight of $CaC_2$
68.4% by weight of CaO and
2.9% by weight of other compounds i.e., the $KBO_2$ introduced was converted in a yield of 97.4% of the theoretical into $KBH_4$ and the $CaH_2$ introduced was converted in a yield of 96.6% of the theoretical into $KBH_4$. The $KBH_4$ was isolated in a manner analogous to Example 1A, the only difference being that the filtration took place at 70° C. A yield of 99.1% of the theoretical was produced with 5 litres of filtrate from 2 kg. of reaction product. On cooling of the filtrate to −15° C., some of the $KBH_4$ precipitated. If the filtrate, after being cooled to −15° C., is used afresh for extraction of the next part of the mixture and the filtrate thereby obtained is again cooled to −15° C., 96.2% of the theoretical of the $KBH_4$ in the crude product are obtained with a purity of 99.8%.

*Example 3*

8.4 g. of sodium metaborate and 21.6 kg. of commercially available calcium carbide are briquetted and processed as described in Example 1. Analysis of the briquettes shows:

27.6% by weight of $NaBO_2$
61.8% by weight of $CaC_2$
8.7% by weight of CaO and
1.9% by weight of other compounds The briquettes are heated in an apparatus as used in Example 1 in a stream of hydrogen (initially 1 cubic metre per hour) at 60 atm. pressure. At 350° C., a reaction begins which causes the temperature to rise quickly to 700–780° C. At 60 atm. and a temperature of 700° C., such quantities of hydrogen (fluctuating between 1 and 12 cubic metres per hour) are sent through the reaction mass that the discharging gas has a composition of 30% by volume of $CH_4$ and 70% of $H_2$. The reaction is allowed to proceed for 5 hours. 23.6 kg. of reaction product are obtained from the 30.0 kg. of material introduced. This loss in weight of 6.4 kg., due to the formation of $CH_4$, corresponds to the formation of 12.2 kg. of $CaH_2$ from 18.3 kg. of $CaC_2$, whereas according to analysis 18.5 kg. of $CaC_2$ are present.

The reaction product has the following composition:

$NaBH_4$, 17.2% by weight=4.06 kg.
$NaBO_2$
$CaH_2$, 5.1% by weight=1.20 kg.
$CaC_2$, 0.3% by weight=0.71 kg.
CaO, 72.4% by weight=1.18 kg.
Other compounds, 5.0% by weight=1.18 kg.

Consequently, 85.1% of the theoretical of the $NaBO_2$ introduced is converted into $NaBH_4$ and 73.9% of the theoretical of the $CaC_2$ introduced is converted into $NaBH_4$. The 14.9% of the $NaBO_2$ introduced and missing on the basis of the theoretical yield is consequently changed into decomposition products such as B and NaH.

The product is further processed in a manner analogous to that described in Example 1 and yields corresponding results.

*Example 4*

A mixture of 222 parts by weight of calicum chloride and 66 parts by weight of sodium metaborate $NaBO_2$ is dried in a stirrer-type autoclave for half an hour under a stream of completely dry hydrogen at about 300° C. While stirring, 92 parts by weight of metallic sodium in the form of sodium sand are thereafter introduced in portions over a period of 2 hours and stirring is continued for another 30 minutes. Thereafter, the autoclave is closed, the hydrogen pressure is raised to 30 atm. and the temperature increased to 400–600° C. while keeping this hydrogen pressure constant. After completion of the reaction, which is indicated by a rise in temperature and which proceeds in accordance with the following equation:

$$2CaCl_2 + NaBO_2 + 4Na + H_2 \rightarrow NaBH_4 + 2CaO + NaCl$$

the hydrogen pressure is allowed to fall to atmospheric and the reaction mass is removed from the autoclave after cooling under a hydrogen atmosphere.

By an extraction treatment with suitable solvents, such as for example liquid ammonia or isopropylamine, the sodium boranate is isolated in pure form in an excellent yield.

We claim:

1. Process for the production of a metal borohydride of the formula $M(BH_4)_Y$ in which M is a metal which is a member selected from the group consisting of the series of metals of Al, Mg, Ca, Sr, Ba, Li, Na, K, Rb and Cs, wherein Y is an integer number from 1 to 3 and corresponding to the valence of M, which comprises reacting the hydride of a metal of said series with the metaborate of a metal of said series and selected from the group consisting of the same metal as in said hydride and the metals disposed further to the right of said hydride metal in said series, at a temperature above 100° C. and below the melting point of the mixture, to thereby form the borohydride of the metal of said metaborate and the oxide of the metal of said hydride.

2. Process according to claim 1 in which said metal metaborate is formed during the reaction from an about stoichiometrical mixture of metal oxide and boron oxide.

3. Process according to claim 1 wherein the reaction is carried out in the presence of an equivalent amount, referred to the metal oxide formed, of silicon dioxide, whereby metal silicate is formed.

4. A process according to claim 1, wherein the hydride of the metal of said series is a hydride selected from the group consisting of Mg, Ca, Sr, and Ba.

5. A process according to claim 1, wherein the hydride of the metal of said series is calcium hydride.

6. A process according to claim 1, wherein said hydride and said metaborate are present in an admixture thereof for the reaction and said metaborate is provided in the reaction admixture by adding thereto material selected from the group consisting of the metaborate and the combination of metal oxide of the metal of the metaborate and boron oxide.

7. A process according to claim 6, wherein said material is the metaborate.

8. A process according to claim 6, wherein said material is the metal oxide and boron oxide.

9. Process according to claim 1, in which said metal hydride is formed during the reaction.

10. A process for the production of sodium borohydride, which comprises reacting calcium hydride with sodium metaborate, at a temperature of 350 to 480° C. and at a hydrogen pressure of 30 atm., whereby sodium borohydride and calcium oxide are formed.

11. A process for the production of potassium borohydride, which comprises reacting calcium hydride with potassium metaborate, at a temperature of 350 to 480° C. and at a hydrogen pressure of 30 atm., whereby potassium borohydride and calcium oxide are formed.

12. A process for the production of sodium borohydride, which comprises reacting calcium carbide and hydrogen with sodium metaborate at a temperature of 350° to 780° C. and at a hydrogen pressure of 60 atm., in a stream of hydrogen whereby sodium borohydride and calcium oxide are formed.

13. A process for the production of sodium borohydride, which comprises drying calcium chloride and sodium metaborate in vacuo under a stream of dry hydrogen at about 300° C., adding sodium to the mixture, increasing the hydrogen pressure to 30 atm. and the temperature to 400°, and thereafter to 600° C., whereby sodium borohydride and calcium oxide are formed.

14. Process for the production of a metal borohydride of the formula $M(BH_4)_Y$ in which M is a metal which is a member from the group consisting of the series of metals of Al, Mg, Ca, Sr, Ba, Li, Na, K, Rb and Cs, wherein Y is an integer number from 1 to 3 and corresponding to the valence of M, which comprises reacting the hydride of a metal of said series with the metaborate of a metal of said series and selected from the group consisting of the same metal as in said hydride and the metals disposed further to the right of said hydride metal in said series, at a temperature above 100° C. and below the melting point of the mixture, to thereby form the borohydride of the metal of said metaborate and the oxide of the metal of said hydride, the yield of said metal borohydride being at least about 85%, said yield being from reaction of said metal hydride and said metaborate.

References Cited in the file of this patent

UNITED STATES PATENTS

| | | |
|---|---|---|
| 1,796,265 | Freudenberg et al. | Mar. 10, 1931 |
| 2,702,234 | Alexander | Feb. 15, 1955 |
| 2,715,057 | Pryde | Aug. 9, 1955 |
| 2,741,539 | Banus | Apr. 10, 1956 |
| 2,946,662 | Mosely | July 26, 1960 |

FOREIGN PATENTS

| | | |
|---|---|---|
| 1,120,228 | France | Apr. 16, 1956 |
| 944,487 | Germany | June 14, 1956 |
| 548,676 | Canada | Nov. 12, 1957 |

OTHER REFERENCES

Schlesinger et al.: "Journal of the American Chemical Society," vol. 75, pages 205–209 (January 5, 1953).

Taylor: "Inorganic and Theoretical Chemistry," 9th Ed., 1952, p. 386.

UNITED STATES PATENT OFFICE
CERTIFICATE OF CORRECTION

Patent No. 3,140,150                                          July 7, 1964

Dieter Goerrig et al.

It is hereby certified that error appears in the above numbered patent requiring correction and that the said Letters Patent should read as corrected below.

Column 1, line 12, for "born" read -- boron --; column 2, lines 62 and 63 should appear as shown below instead of as in the patent:

$$2NaH + 1/2BCl_3 \longrightarrow 3/2NaCl + 1/2NaBH_4 \quad + 95,000 \text{ calories}$$
$$CaH_2 + 1/2NaBO_2 \longrightarrow CaO + 1/2NaBH_4 \quad + 1,400 \text{ calories}$$

column 3, line 10, for "theh very different types or metal" read -- the very different types of metal --; line 11, for "Sr(BH)$_2$" read -- Sr(BH$_4$)$_2$ --; line 27, for "CaCO" read -- CaO --; line 52, for "distributing" read -- disturbing --; same column 3, line 72, the ratio should appear as shown below instead of as in the patent:

$$Na_2O:B_2O_3 = 1:1 \text{ or } CaO:B_2O_3 = 1:1$$

column 5, line 40, for "yields" read -- yielded --; line 64, for "grounds" read -- ground --; column 6, line 48, for "NaBO$_2$" read -- NaBO$_2$ - by weight - --; line 51, for "1.18 kg." read -- 17.1 kg. --.

Signed and sealed this 24th day of November 1964.

(SEAL)
Attest:

ERNEST W. SWIDER                                       EDWARD J. BRENNER
Attesting Officer                                    Commissioner of Patents